US008230400B2

(12) United States Patent  
Horn et al.

(10) Patent No.: US 8,230,400 B2
(45) Date of Patent: Jul. 24, 2012

(54) CONTROLLER FOR A MACHINE WITH DEBUG FUNCTIONALITY

(75) Inventors: Wolfgang Horn, Hohenstein-Ernstthal (DE); Norbert Kosel, Chemnitz (DE); Gerd Müller, Chemnitz (DE); Jörg Singer, Chemnitz (DE)

(73) Assignee: Siemens Aktiengesellschaft, München (DE)

( * ) Notice: Subject to any disclaimer, the term of this patent is extended or adjusted under 35 U.S.C. 154(b) by 1094 days.

(21) Appl. No.: 11/794,290

(22) PCT Filed: Dec. 16, 2005

(86) PCT No.: PCT/EP2005/056881
§ 371 (c)(1),
(2), (4) Date: Jun. 26, 2007

(87) PCT Pub. No.: WO2006/069927
PCT Pub. Date: Jul. 6, 2006

(65) Prior Publication Data
US 2008/0134146 A1 Jun. 5, 2008

(30) Foreign Application Priority Data
Dec. 27, 2004 (DE) .................... 10 2004 062 852

(51) Int. Cl.
*G06F 9/44* (2006.01)
(52) U.S. Cl. .................. 717/129; 717/124; 717/125
(58) Field of Classification Search .................. None
See application file for complete search history.

(56) References Cited

U.S. PATENT DOCUMENTS

| 6,718,484 | B1 * | 4/2004 | Kodera | 714/35 |
| 6,981,248 | B2 * | 12/2005 | Bates et al. | 717/129 |
| 7,086,033 | B2 * | 8/2006 | Bates et al. | 717/124 |
| 7,225,433 | B2 * | 5/2007 | Jentsch et al. | 717/129 |
| 7,478,366 | B2 * | 1/2009 | Bickson et al. | 717/124 |
| 7,530,053 | B2 * | 5/2009 | Pugh et al. | 717/124 |
| 7,634,761 | B2 * | 12/2009 | Buschardt et al. | 717/129 |
| 7,823,131 | B2 * | 10/2010 | Gard et al. | 717/125 |
| 7,890,931 | B2 * | 2/2011 | Lauzon et al. | 717/125 |
| 7,945,900 | B2 * | 5/2011 | Hsieh et al. | 717/129 |
| 2002/0162051 | A1 * | 10/2002 | Bolding et al. | 714/34 |
| 2003/0014736 | A1 * | 1/2003 | Nguyen et al. | 717/129 |
| 2003/0066054 | A1 * | 4/2003 | Aarts et al. | 717/129 |
| 2005/0055605 | A1 * | 3/2005 | Blumenthal et al. | 714/13 |

FOREIGN PATENT DOCUMENTS

| EP | 1 184 758 A2 | 3/2002 |
| JP | 05094208 A | 4/1993 |
| JP | 2002091521 A | 3/2002 |

* cited by examiner

*Primary Examiner* — Thuy Dao

(57) ABSTRACT

There is described a control device of a machine, an engineering system and a method for operating said control device. Said control device is used to control and/or regulate the machine and is used to carry out at least one user program which is used to at least perform one function, and said control device comprises a debug function. The functionality of the debug function is limited in large user programs due to the high complexity and the unclearness thereof. According to the invention, in order to improve said function, the user program comprises stop points for the debug function and said stop points can be activated and/or deactivated.

10 Claims, 1 Drawing Sheet

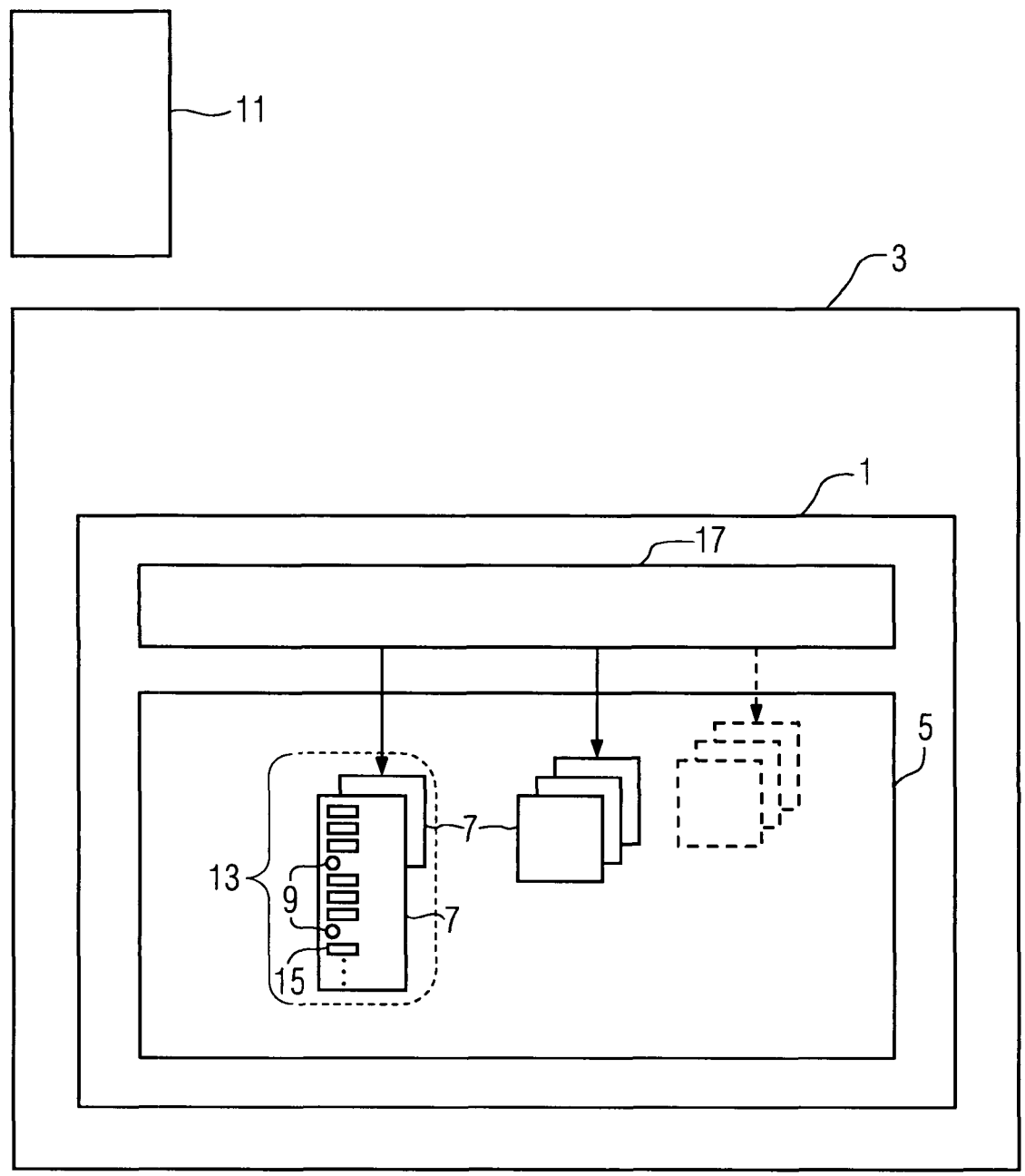

CONTROLLER FOR A MACHINE WITH DEBUG FUNCTIONALITY

CROSS REFERENCE TO RELATED APPLICATIONS

This application is the US National Stage of International Application No. PCT/EP2005/056881, filed Dec. 16, 2005 and claims the benefit thereof The International Application claims the benefits of German application No. 10 2004 062 852.1 DE filed Dec. 27, 2004, both of the applications are incorporated by reference herein in their entirety.

FIELD OF INVENTION

The invention relates to a controller for a machine. The machine is, for example, a machine tool, a production machine or an automatic handling machine. The machine can be controlled and/or regulated using the controller.

BACKGROUND OF THE INVENTION

The controller is intended to execute at least one user program. User programs are programs which can be created using an engineering system, for example, and run on a controller. In the case of a machine tool for example, a user program can be used to program a sequence of control instructions for at least one feed axis of the machine tool. In this case, a tool of the machine tool is intended to cover a contour of a workpiece, for example.

A user program can also be used, for example, to control a production process in a production machine, the production machine being a plastic injection molding machine, for example. The user program has, in particular, a sequence of instructions which can then be executed by a controller, for example a programmable logic controller (PLC). However, the controller may also be, for example, a CNC controller, an NC controller or else a drive regulator for an electrical machine, the controller having, in particular, both control functionality and regulating functionality.

A debugger can be used to test a program which can be executed on the controller. The debugger is a test program which makes it possible to test the user program, for example. A user who has designed (programmed) the user program, for example, can use the debugger to execute said user program step by step, the execution of the user program being able to be repeatedly interrupted. This makes it possible to detect errors in the user program, for example, or else to optimize the user program. As a result of the fact that the user programs are becoming increasingly large and are of more complex design, it is becoming increasingly difficult to obtain these advantages of debugging using the debugger since, on account of the complexity, the states of the user program which have been stopped can scarcely be detected by the human user any more.

SUMMARY OF INVENTION

The invention is based on an object of improving the debug functionality for a controller.

In this case, the object is achieved in the case of a controller having the features claimed in an independent claim. The object can also be achieved in the case of an engineering system having the features claimed in a further independent claim. A method having the features claimed in an additional independent claim can also be used to achieve the object. The dependent claims describe developments.

In the case of a controller for a machine, which is intended to control and/or regulate the machine, the controller is intended to execute at least one user program. The user program can be created, for example, in an engineering system by a user. The user program is intended to at least carry out a function, the controller having a debug function. The function is, for example, an arithmetic instruction or an instruction for executing a subroutine or a movement instruction in the case of a controller for movement sequences, as is used, for example, in machine tools or automatic handling machines (robots). The debug function is a function which allows program execution to be interrupted. This can be used, for example, to determine states of the program at a particular position in program execution. According to the invention, the user program now has one or more stopping points for the debug function, the stopping points being able to be activated and/or deactivated. The stopping points are used to interrupt execution of the program at the position of the stopping points. In this case, the program is, for example, the user program or else a runtime program in which the user program is integrated. The activating or deactivating function makes it possible to select and deselect stopping points in a flexible manner, with the result that handling of the debug functionality is considerably improved.

According to the invention, the controller can also be designed in such a manner that the user program has one or more stopping points for the debug function, the stopping point being associated with a function and this associated function being able to be stopped by the stopping point, further functions of the user program still being able to be executed, the stopping points of the user program being able to be activated and/or deactivated, in particular. This functionality makes it possible to stop only part of a user program, so that other parts of the user program continue to run. This increases not only the clarity but also contributes to preventing the functionality of the user program from being unnecessarily impaired during ongoing operation of the user program on a controller. Only those functions which are currently not required for the control function for ongoing operation can advantageously be subjected to debugging during ongoing operation of a user program.

In another advantageous refinement, the stopping points can be programmed. This means that a user himself can determine the point in a program at which the program can be stopped. This makes it possible to find out about program states of a user program in a very detailed manner. This is advantageous both during engineering and during commissioning.

The controller is advantageously also designed in such a manner that the programming of one or more stopping points can be blocked. This is expedient, in particular, when, for example in an engineering system, a user provides a user program with stopping points and does not exactly know whether stopping the program in a particular processing step may result in a program crash.

In another refinement of the invention, a selection of at least one function can be used to activate and/or deactivate the stopping point(s) within this function. If a function therefore comprises a plurality of program steps, one or more stopping points can be programmed within the function. The stopping point(s) within a function can advantageously be activated and/or deactivated by selecting the function. In another development, it is also possible to determine a group of functions and to activate and/or deactivate all of the stopping points within a group.

Different groups of stopping points may also be advantageously defined, with the result that the stopping points can be activated and/or deactivated in a manner dependent on the group, for example. This increases the flexibility of the debug function.

In another refinement, there are different types of stopping points, one type being intended, for example, to enable a debug function within a simulation environment and another type being intended for a debug function in a runtime system, these stopping points being used, in particular, to interrupt execution of the user program on the controller during operation of the machine. In this case, the function of being able to block the stopping points, in particular, is extremely important so that damage to the machine, which is controlled and/or regulated by the controller, is avoided.

In addition to the functionality whereby a group of functions, for which stopping points contained therein can be activated and/or deactivated, can also be selected, the controller is also extended by the functionality whereby a first function which can be carried out is not influenced by a second function which has been stopped using a stopping point. This means that a function, for example a subroutine, within the user program can be stopped, other functions, that is to say other subroutines, for example, still being able to be processed and also being processed. Processing is carried out, for example, until an item of information is required, for further processing, from the function which has been stopped. The controller can thus also be designed in such a manner that a first function which can be carried out is not influenced by a second function which has been stopped using a stopping point as long as the first function does not require any data from the second function for progression of the function.

In addition to a controller, which is also to be understood as meaning a control system, in particular, the invention also relates to an engineering system for a controller for a machine, which is intended to control and/or regulate the machine. The controller is intended to execute at least one user program, the user program being intended to at least carry out a function, and the controller and/or the engineering system having a debug function. The engineering system can be designed in such a manner that it has the above-described refinements in the same manner as the controller described.

In addition to the apparatuses described, the invention also relates to the resultant methods. In a method for operating a controller for a machine, which is intended to control and/or regulate the machine, the controller being intended to execute at least one user program, the user program being intended to at least carry out a function, and the controller having a debug function, at least one stopping point for the debug function is inserted into the user program. The stopping point(s) can be advantageously activated or deactivated, a selection of at least one function being used, in particular, to activate or deactivate the stopping point(s) within this function.

In another refinement of the method, a first function is carried out, a second function being stopped using a stopping point.

The method can also be advantageously carried out in such a manner that the first function is carried out until it requires information from and/or relating to the second function which has been stopped.

Various advantages result for a user of the apparatus according to the invention and a method according to the invention. If a system, a process, a movement or the like is controlled by a user program and if technology objects are used for control for this purpose, for example, the user program is advantageously subdivided into a plurality of functions. These functions may also be referred to as a task and form functional units. Although a debugger has hitherto already been able to interrupt the user program, that is to say the functions as well, at stopping points and to continue it again, this procedure is not always advantageous in the case of large user programs, in particular for looking for errors. For example, this may be due to the fact that a process to be controlled or a movement cannot be suddenly stopped or continued. According to the invention, it is now possible to stop only parts of the user program. These parts are the functions. A function is, in particular, a closed program unit, for example a subroutine or a program section for calculating a movement path. In the event of an error in the interaction between a plurality of functions, only these functions may now be stopped according to the invention. This simplifies the debug function for a user and makes it clear.

It is advantageously possible to combine functions in a group by selecting functions, this group comprising at least one function of a user program or all functions of the user program. During debugging, in particular of a real-time system of an automation device, tasks are advantageously combined to form a task group and are then jointly "debugged" (joint stopping, starting, . . . ). The tasks can be combined to form task groups around debuggers, for example, so that a task programmer no longer has to worry about them. Automatic analysis of task calls and/or interleaving is also advantageous.

In another refinement of the invention, it is now possible to use a debugger to set up stopping points at which processing of the user program is interrupted only when the stopping point of a function from the group formed is reached. All functions of the group formed are then advantageously jointly stopped or jointly continued, functions outside the group formed continuing to run. This functionality thus means that part of the user program can be stopped, while another part of the user program continues to run.

In another embodiment, the user program can only ever be stopped at one stopping point at the same time. The interaction between a plurality of functions, which are also generally referred to as a task, can be tested in a simple manner using the debug functionalities described. It is easy to comprehend which program parts are stopped or continued. Coupled sequences which are controlled in a plurality of functions can be jointly interrupted and jointly continued.

Another refinement provides for the stopping point to be activated only in an nth pass. This makes it possible to test a program step by step.

After a stopping point which is activated has been reached, at least one of the following reactions may occur:

All of the functions or selected functions (tasks) are stopped

All of the outputs or selected outputs of the controller are disconnected

All of the times or selected times are stopped

All of the monitoring operations or selected monitoring operations are switched off The technology no longer regulates The outputs are enabled again when the program is continued All of the functions are continued again when the program is continued The program line containing the stopping point is marked in color.

BRIEF DESCRIPTION OF THE DRAWING

One exemplary embodiment of the invention is shown in the illustration shown in FIG. 1.

DETAILED DESCRIPTION OF INVENTION

The illustration shown in FIG. 1 shows a machine 3. The machine 3 has a controller 1. A user program 5 can be created using an engineering system 11. The controller 1 has a debugger 17 for a user program 5 of the controller 1. The user program 5 has functions 7, the functions also being able to be referred to as a task. The number of functions 7 can be advantageously determined by a user. The dashed lines are intended to indicate the variability in the number of functions. The functions 7 may be combined in a group 13. The FIGURE emphasizes the functions 7 of the group 13 using a bolder line. The functions 7 have program code 15, for example. The program code 15 can be processed step by step with the aid of the debugger, the program code having stopping points 9. The stopping points 9 mark the location within the function at which processing of the function by the debugger 17 is intended to stop. The functions are used, for example, to control a system, to control a process or else to guide movement using technology objects.

The user program runs, for example, in the functions 7 illustrated, two functions 7 being combined in a group 13. The stopping points 9 can be activated and deactivated in these functions 7 of the group 13. If a stopping point 9 within a function 7 of the group 13 is then reached during program execution, the functions of the group are interrupted. However, the other functions outside the group 13 continue to run. The debugger 17 registers the interruption point in the function. If a continuation command is given, the functions 7 within the group 13 are continued. If, for example, a further stopping point 9 within the group 13 is now reached, this being independent of the function 7 in which the stopping point is situated within the group 13, all of the functions 7 within the group 13 are in turn interrupted. The debugger 17 again registers the interruption point.

The invention claimed is:

1. A method executed by a processor for operating a machine comprising a controller that executes via the processor at least one user program having a plurality of functions stored therein, each of the functions for executing code comprising a series of instructions that control the machine, and a debug function for testing the user program by controlling a plurality of stopping points marking particular locations in the user program at which processing is to be stopped, comprising:

combining selected functions into different groups for joint debugging of the functions of a group such that all of the stopping points within a selected group are selectively activated or deactivated together;

debugging the user program via the debug function for a selected group by receiving a selection of the selected group to be debugged, activating all of the stopping points within the selected group, and for the plurality of functions in the selected group:

stopping on the processor, as stopping points are reached during execution on the processor, all of the functions for the selected group to allow stopping of only part of the user program comprising the selected group, while functions outside the selected group continue to run on the processor unless and until data from the functions within the stopped group is needed by functions outside the stopped group, thereby allowing joint debugging of the functions for the selected group without interrupting functions outside the selected group being executed on the processor.

2. The method as claimed in claim 1, wherein the function is a subroutine of the user program.

3. The method as claimed in claim 1, wherein the controller is a real time controller.

4. The method as claimed in claim 1, wherein at least one stopping point causes one of the results selected from the group consisting of:

all outputs or selected outputs of the controller are disconnected, all times or selected times are stopped, and all monitoring operations or selected monitoring operations are switched off.

5. The method as claimed in claim 1, wherein stopping points are of different types wherein one or more stopping points is selectively blocked based on the type of stopping point such that during simulation debugging stopping points of one type are blocked on the processor and during runtime debugging stopping points of another type are blocked on the processor to avoid damage to the machine.

6. The method as claimed in claim 5, wherein the type of the stopping point is selected form the group consisting of: enable a debug function within a simulation environment, and enable a debug function within a runtime system.

7. A controller for a machine comprising a processor for executing code to control the machines, comprising:

a user program to be executed by a processor of the controller, wherein the user program has a plurality of functions stored therein, each of the functions for executing code comprising a series of instructions that control the machine;

a debug function executed by the processor of the controller to test the user program wherein the debug function controls, by activating and deactivating, a plurality of stopping points marking particular locations in the user program at which processing is stopped on the processor, wherein the debug function is adapted to combine selected functions into different groups for joint debugging of the functions of a group such that all of the stopping points within a selected group are selectively activated or deactivated together by the debug function in accordance with the selected group, and wherein as stopping points are reached during execution on the processor for a selected group, all of the functions within the selected group are interrupted on the processor to allow stopping of only part of the user program comprising the selected group, while functions outside the selected group continue to run on the processor unless and until data from the functions within the stopped group is needed by functions outside the stopped group, thereby allowing joint debugging of the functions of the selected group without interrupting functions outside the selected group being executed on the processor.

8. The controller as claimed in claim 7, wherein programming of one or more stopping points is selectively blocked based on a type of stopping point such that during simulation debugging stopping points of one type are blocked on the processor and during runtime debugging stopping points of another type are blocked on the processor to avoid damage to the machine.

9. An engineering system for controlling a production process, comprising:
- a production machine for performing a production process;
- a controller comprising a processor that controls the production machine, the controller having stored therein a user program to control the production machine and a debug function to test the user program,
- wherein the user program comprises a plurality of functions stored therein, each of the functions for executing code comprising a series of instructions that control the production machine; and
- wherein the debug function, when executed by the processor of the controller to test the user program controls, by activating and deactivating, a plurality of stopping points marking particular locations in the user program at which processing is stopped on the processor,
- wherein the debug function is adapted to combine selected functions into different groups for joint debugging of the functions of a group such that all of the stopping points within a selected group are selectively activated or deactivated together by the debug function in accordance with the selected group, and
- wherein as stopping points are reached during execution by the processor for a selected group, all of the functions within the selected group are interrupted on the processor to allow stopping of only part of the user program comprising the selected group, while functions outside the selected group continue to run on the processor unless and until data from the functions within a stopped group is needed by functions outside the stopped group, thereby allowing joint debugging of the functions of the selected group without interrupting functions outside the selected group being executed on the processor.

10. The engineering system as claimed in claim 9, wherein one or more stopping points is selectively blocked based on a type of stopping point such that during simulation debugging stopping points of one type are blocked on the processor and during runtime debugging stopping points of another type are blocked on the processor to avoid damage to the machine.

* * * * *